United States Patent
Yamanaka

[11] 4,016,598
[45] Apr. 5, 1977

[54] SOLID STATE CAMERA HAVING PLURAL IMAGE SENSORS

[75] Inventor: Seisuke Yamanaka, Mitaka, Japan

[73] Assignee: Sony Corporation, Tokyo, Japan

[22] Filed: Mar. 26, 1975

[21] Appl. No.: 562,347

[30] Foreign Application Priority Data

Mar. 29, 1974 Japan .............................. 49-35276
Apr. 25, 1974 Japan .............................. 49-46941

[52] U.S. Cl. .................................. 358/41; 357/30
[51] Int. Cl.² ........................................ H04N 9/04
[58] Field of Search ................ 358/41, 43, 50, 51, 358/52; 357/24, 30, 31

[56] References Cited

UNITED STATES PATENTS 3,777,061  12/1973  Takemura ........................ 358/44
3,876,989  4/1975  Bankowski et al. ........ 307/221 D X Primary Examiner—Howard W. Britton
Assistant Examiner—Mitchell Saffian
Attorney, Agent, or Firm—Hill, Gross, Simpson, Van Santen, Steadman, Chiara & Simpson

[57] ABSTRACT

Two charge coupled devices (which will be hereinafter referred to as CCD chips) are employed in a solid state camera system wherein color filters, each consisting of horizontally extended color stripe filter elements, are disposed in front of the respective CCD chips. Object images are projected onto the respective CCD chips through the color filters such that the object image on one CCD chip is shifted by $\tau_{H/2}$ (where $\tau_H$ is the alignment pitch of picture elements in the direction of horizontal scanning) relative to the object image on the other CCD chip. To read image information from the CCD chips, the read-out timing as between the two chips is different by $\tau_{H/2}$ to compensating for the image displacement of the chips.

6 Claims, 24 Drawing Figures

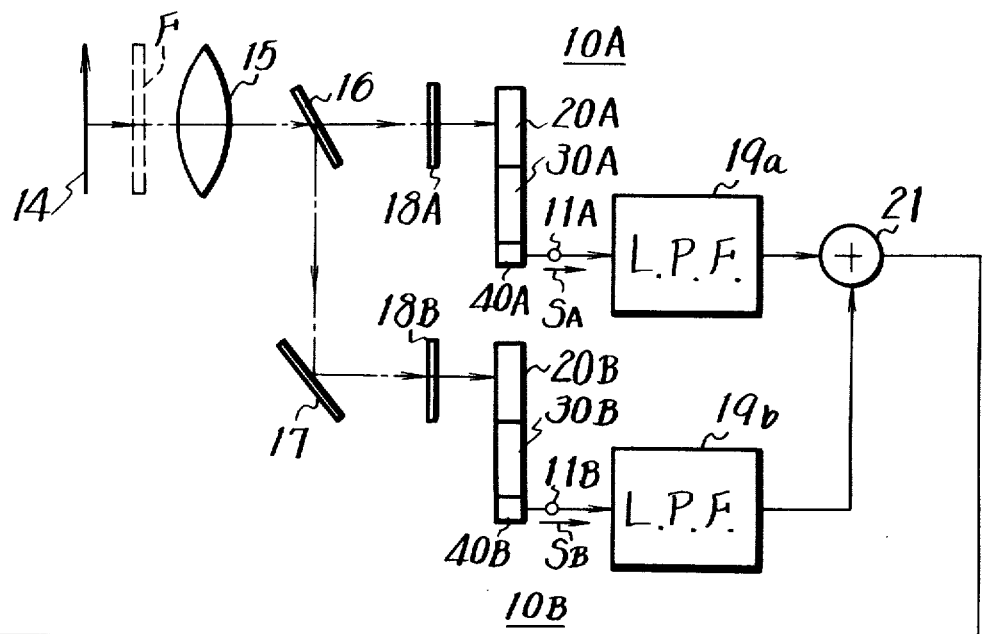
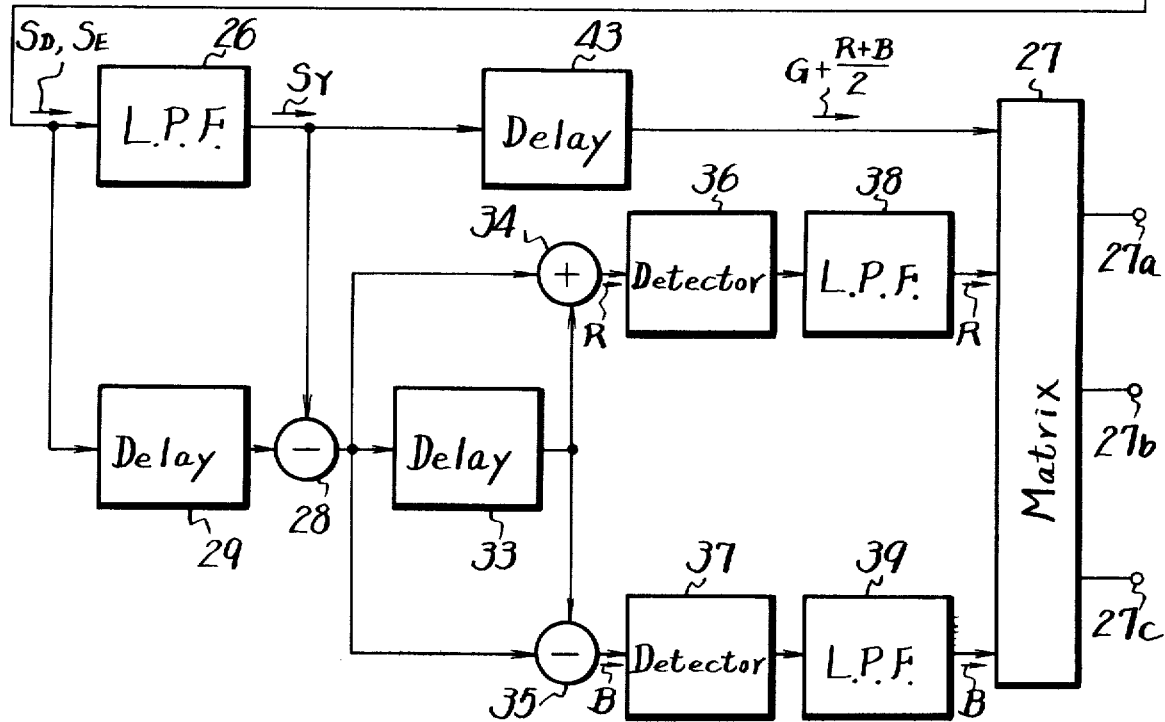
Fig-2

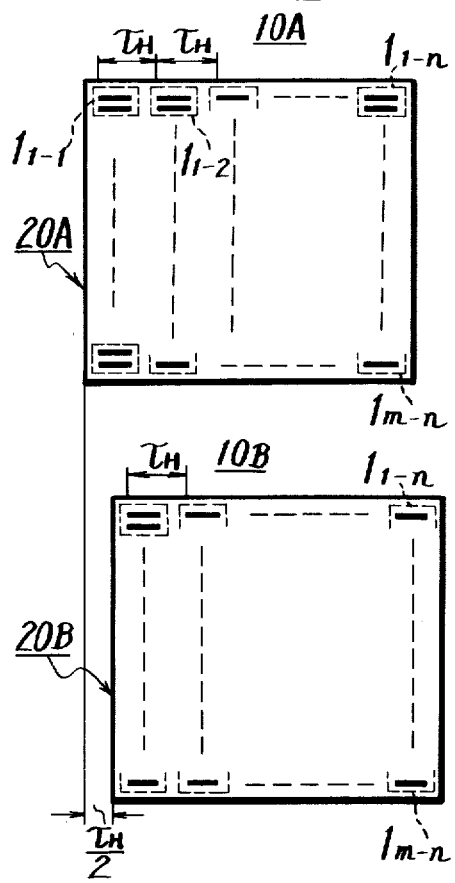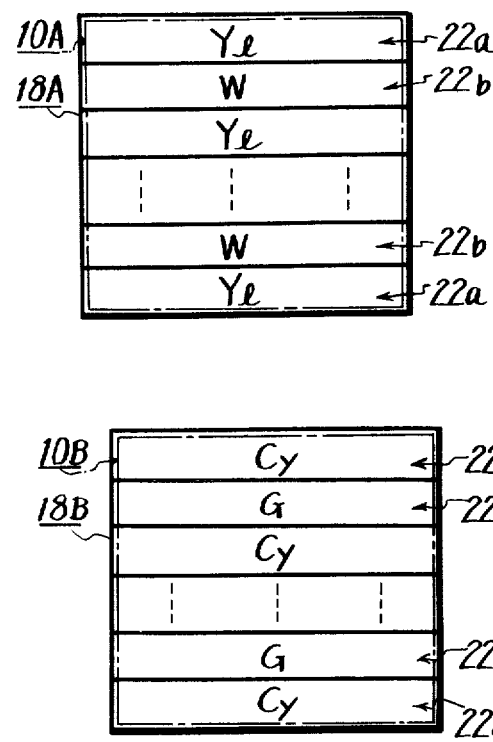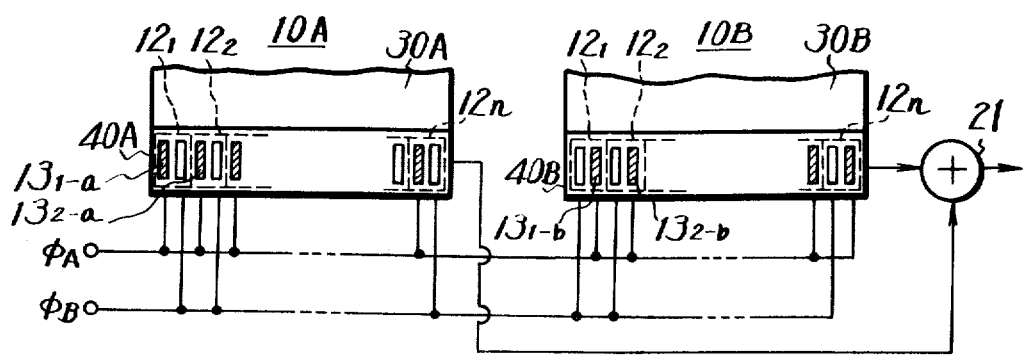

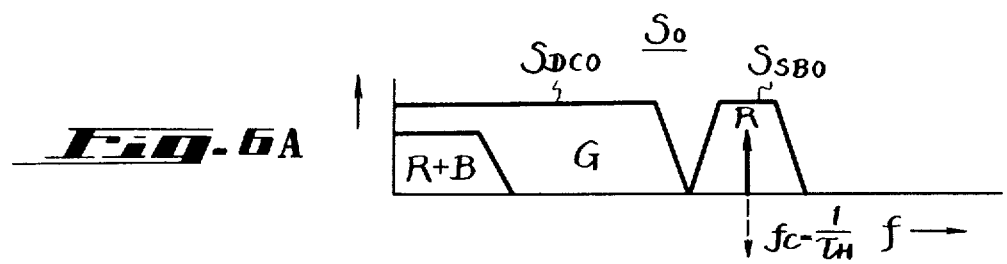
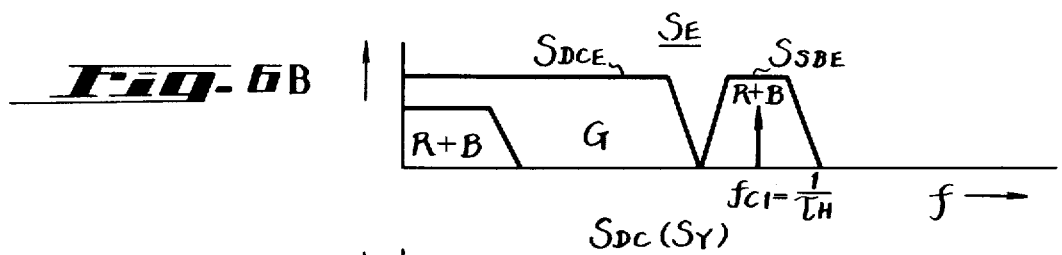
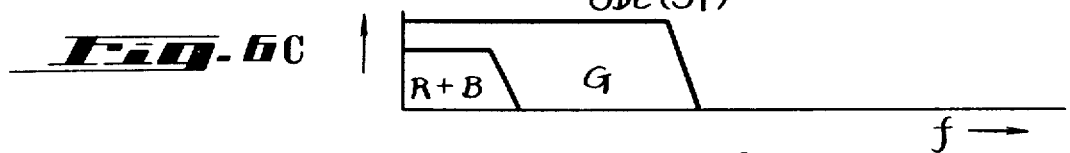
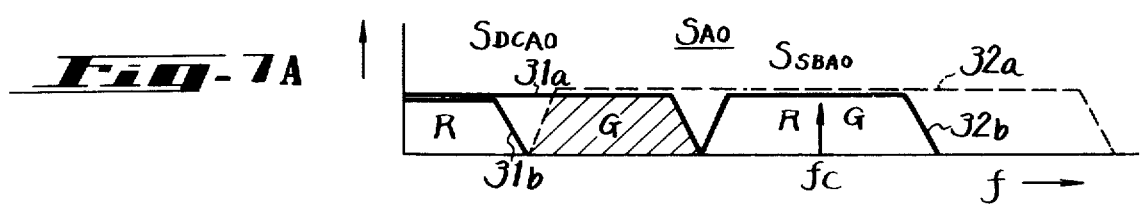
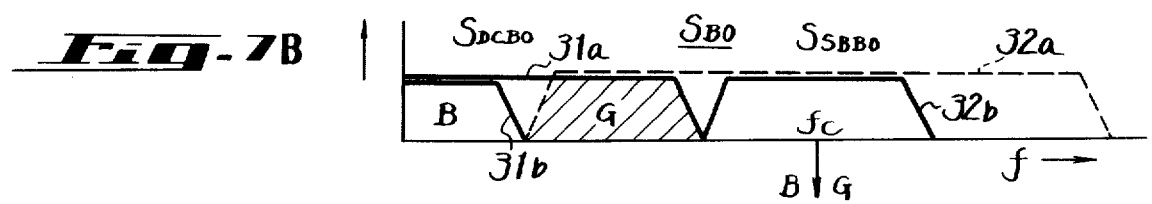

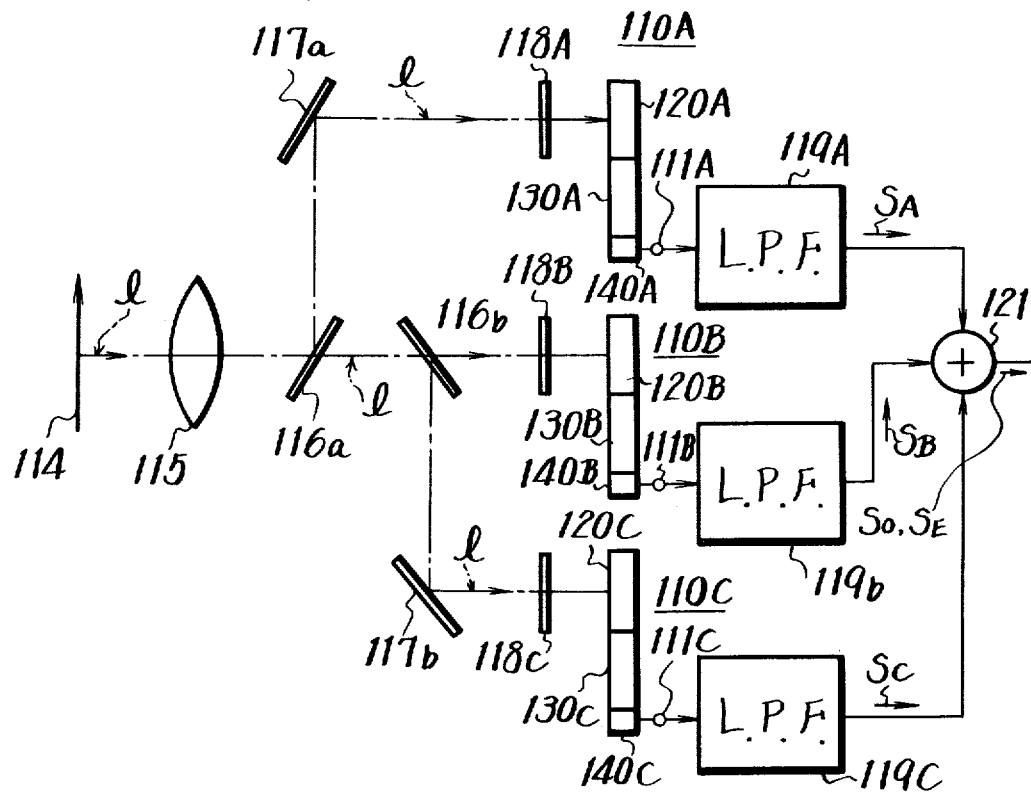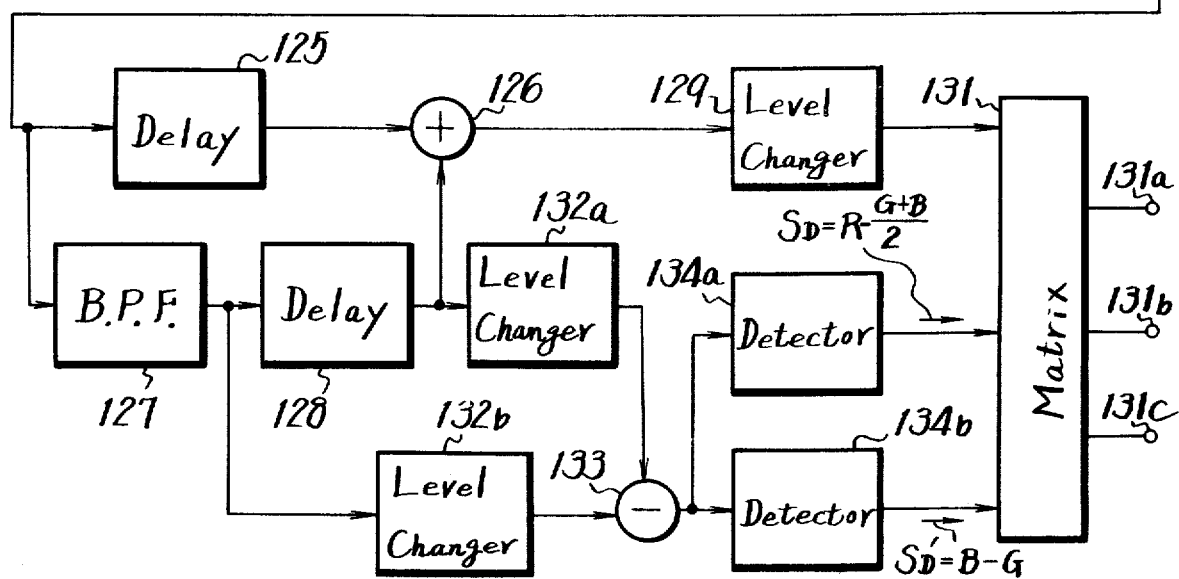

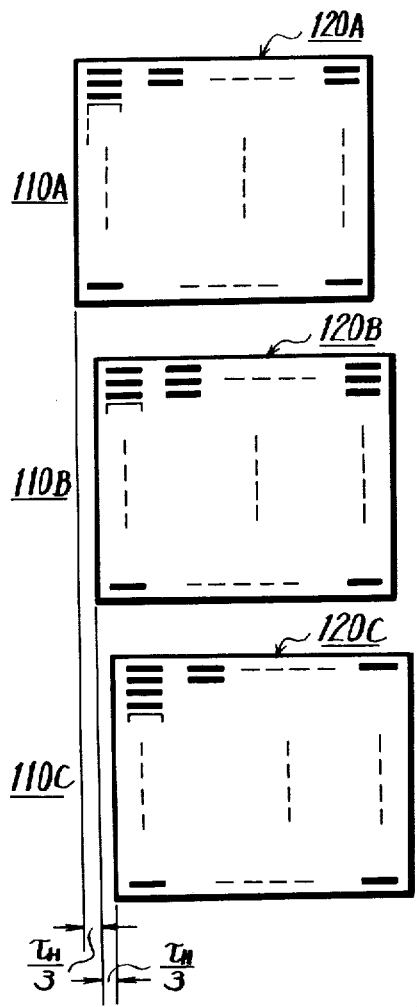
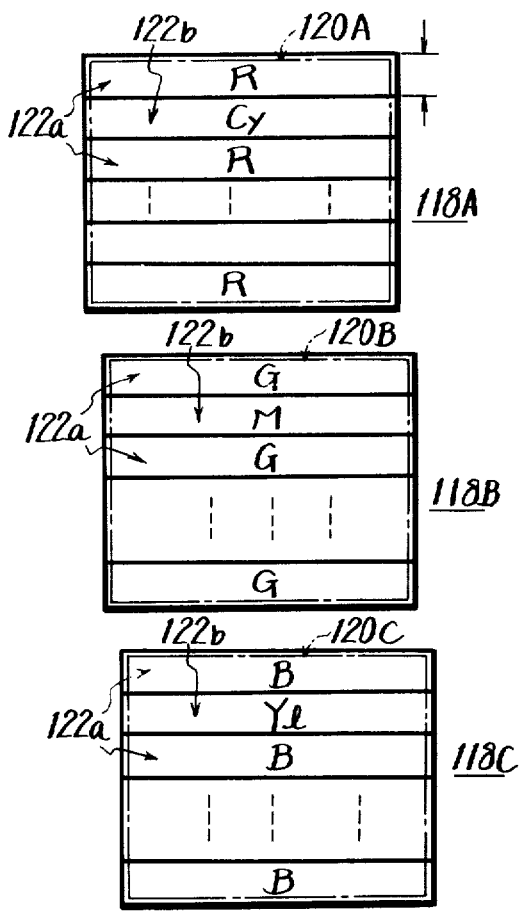
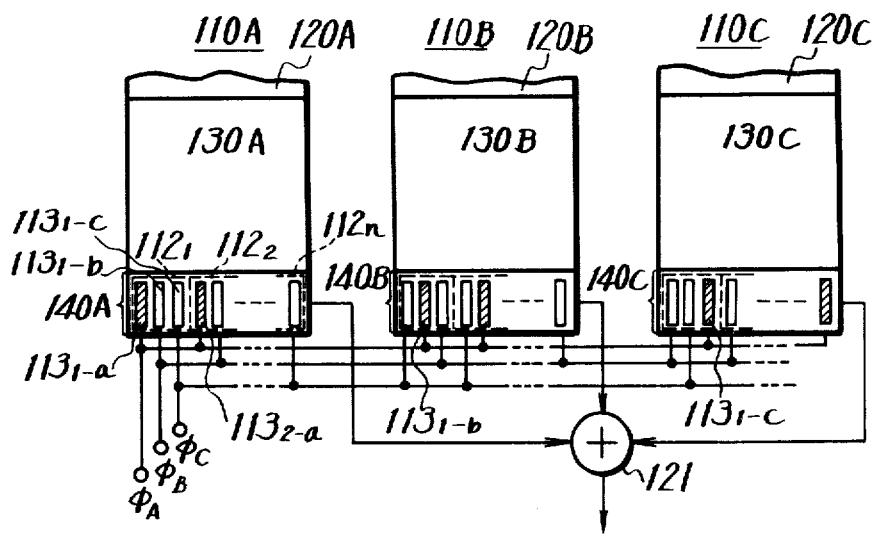

4,016,598

SOLID STATE CAMERA HAVING PLURAL IMAGE SENSORS

BACKGROUND OF THE INVENTION

1. Field of the Invention

This invention relates generally to a solid state color camera employing solid state image senors and more particularly to a camera the requires two or three image sensors with horizontally extending stripe color filters.

2. Description of the prior art

When a solid state image sensor, such as a CCD, is used as a television camera, input light information from an object image is sampled at every picture element and then converted into a video signal. If the alignment pitch of picture elements in the horizontal direction of the CCD is taken as $\tau_H$, the sampling frequency, $f_c$, maybe expressed as $1/\tau_H$. If the input light information of each picture element is read sequentially in the horizontal direction, DC components, $S_{DC}$, as an output video signal of, one horizontal line period, and side band components, $S_{SB}$, which are obtained by modulating the sampling frequency $f_c$ with the DC components $S_{DC}$, are obtained. The side band components, $S_{SB}$, become upper and lower side bands with the sampling frequency, $f_c$, being at the center. If the band of DC components $S_{DC}$ is selected sufficiently wide to obtain the desired resolution, the side band components $S_{SB}$ become superimposed on the DC components, $S_{DC}$. As a result, there appears a sampling error which is caused by Nyquists sampling theorem. If an image is reproduced from the above state of a video signal, a flicker may appear in the reproduced picture.

Since this flicker is caused by the sampling error, if the band of the DC components $S_{DC}$ is limited within a band narrower than one half, the sampling frequency, $f_c$, the sampling error and hence the flicker in the reproduced picture can be avoided. However, if the band of the DC components, $S_{DC}$, is limited as described above, the resolution is deteriorated. If the band of the DC components, $S_{DC}$, is selected so as not to deteriorate the resolution and the sampling error is prevented, it would be enough to select the sampling frequency $f_c$ at a suitably high number. Since the sampling frequency $f_c$ is a product of the number, $n$, of picture elements in the horizontal direction and the horizontal scanning frequency $f_H(f_c= n \cdot f_H)$, to make the sampling frequency $f_c$ high enough to the sampling error, it is necessary to increase the number of the picture elements to the point where the manufacture of the CCD becomes difficult and costly.

SUMMARY OF THE INVENTION

It is a feature of this invention to provide a solid state color camera in which, even with a relatively small number of picture elements the influence of sampling error, is reduced and high resolution is obtained. Accordingly, if a CCD having a plurality of elements formed on a single semiconductor substrate is employed as a solid state image sensor, each image sensor does not require as fine a pattern of picture elements as that of prior art systems. Therefore, the manufacture of the solid state image sensor is an easier task.

In a preferred embodiment of this invention, two solid state image sensors and two color filters corresponding thereto are employed. In another embodiment of the invention, three solid state image sensors and three color filters corresponding thereto are used.

In either of the above embodiments, in order to cancel side band components caused by sampling the aligned picture elements, it is necessary to shift the positions of the object image on the respective solid state image sensors and also to shift the reading signals of the respective solid state image sensors.

Accordingly, an object of the invention is to provide a novel solid state color camera.

Another object of the invention is to provide a solid state color camera in which plural solid state image sensors and plural color filters, which have color strip filter elements in the horizontal scanning direction in correspondance with the respective plural solid state image sensors, are used.

Additional objects, features, and advantages of this invention will become apparent from the following description and the associated drawings.

BRIEF DESCRIPTION OF THE DRAWINGS

FIG. 2 is a block diagram showing an embodiment of the solid state color camera according to this invention in which two CCDs of the type shown in FIG. 1 are employed;

FIG. 3 is a diagram showing the positional relationship between two CCD image sensor chips employed in the solid state color camera of FIG. 2;

FIG. 4 is a diagram showing one method for supplying read-out clock pulses to the read-out registers of the two CCD image sensor chips employed in the solid state color camera of FIG. 2;

FIG. 5 is a plan view showing an example of color filters used in the solid state color camera of FIG. 2;

FIGS. 6A to 6E, inclusive, are frequency spectrum diagrams used for explaining the operation of the solid state color camera of in FIG. 2;

FIGS. 7A and 7B are frequency spectrum diagrams of signals obtained from the CCD chips used in the solid state color camera of FIG. 2;

FIG. 8 is a block diagram showing another embodiment of the solid state color camera of the invention;

FIG. 9 is a plan view showing the positional relationship among three CCD image sensor chips employed in the solid state color camera of FIG. 8;

FIG. 10 is a diagram showing a method for supplying read-out clock pulses to the read-out registors of the three CCD image sensor chips used in the solid state color camera of FIG. 8;

FIG. 11 is a plan view showing embodiments of color filter employed in the solid state color camera of FIG. 8;

DESCRIPTION OF THE PREFERRED EMBODIMENTS

Although the solid state color camera of this invention will be described with reference to the drawings the two-phase or three-phase type CCD is used by way of example only.

First, the two-phase type CCD will be described with reference to FIG. 1.

Figure 1:
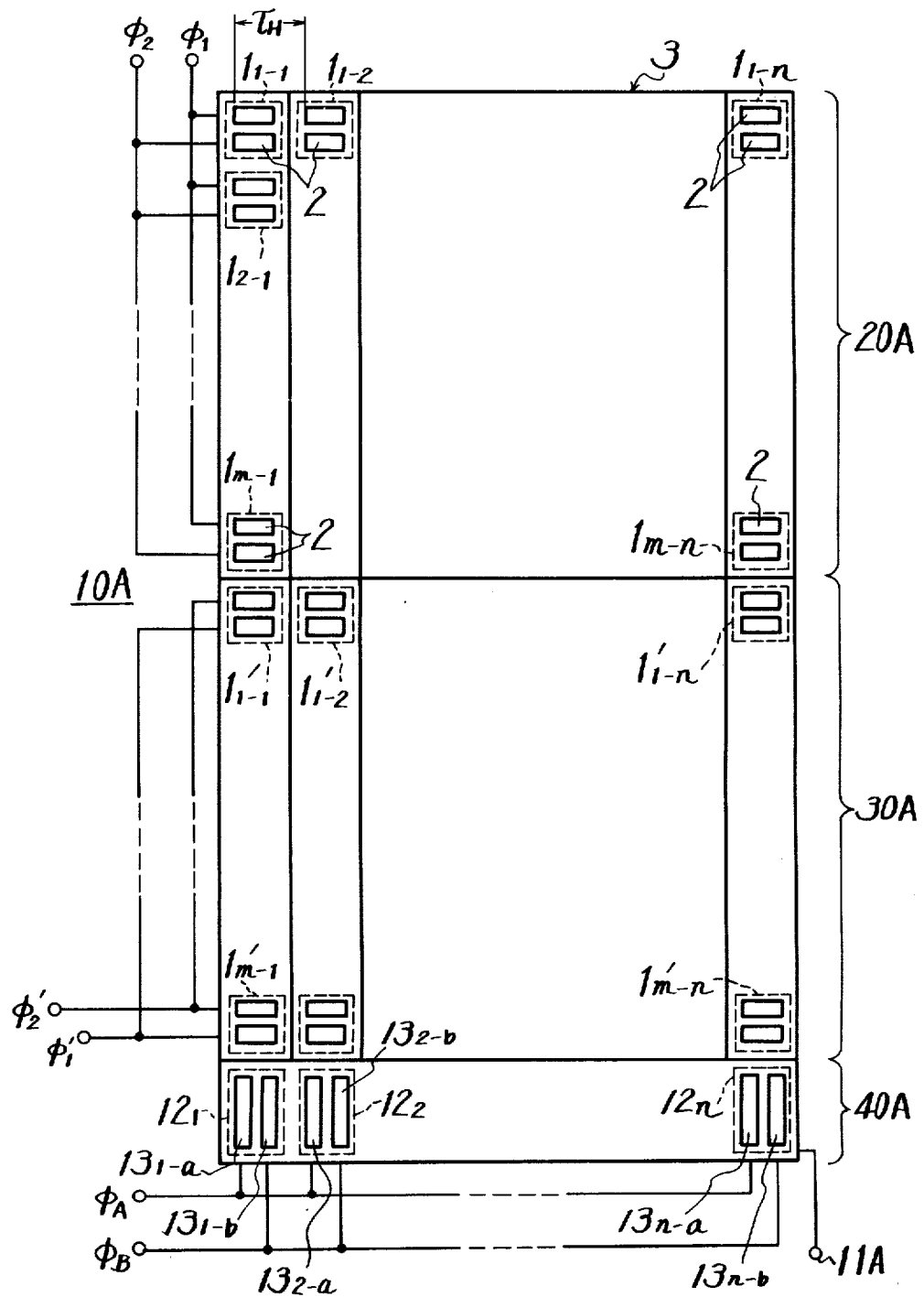
FIG. 1 is a plan view showing a CCD image sensor which can be used as a solid state image sensor of the invention.

FIG. 1, reference numeral 10A generally designates a CCD which may be formed on a semiconductor substrate such as is a silicon substrate 3. The CCD 10A is formed, as well known, of a photo sensitive array 20A onto which an object image is projected, a temporary storage array 30A which stores the charges in response to input light information from the object image, and a read-out register 40A from which an output video signal is read. The photo sensitive array 20A includes a desired number of picture elements $1_{1-1}$, $1_{1-2}$, - - - $1_{m-n}$ which are aligned in the horizontal and vertical directions with a predetermined alignment pitch $\tau_H$ in the horizontal direction. Each of the picture elements $1_{1-1}$, $1_{1-2}$ - - - $1_{m-n}$ has two photo sensing cells 2, respectively, and two electrodes $\phi_1$ and $\phi_2$, which will be described later, are provided in association with the two photo sensing cells 2.

When the object image is projected onto the photo sensitive array 20A, the input light information from the image causes the induction of electric charges in the semiconductor substrate 3 opposing the photo sensing cells 2 which, corresponding to any of the electrodes $\phi_1$ and $\phi_2$, are supplied with a predetermined bias voltage. Accordingly, if a well known transfer clock pulse is applied to the electrodes $\phi_1$ and $\phi_2$, the charges induced in the semiconductor substrate 3 opposing the picture elements $1_{1-1}$, $1_{1-2}$, - - - $1_{m-n}$ in the horizontal scanning lines are sequentially stored in the temporary storage array 30A on the corresponding horizontal scanning lines at every vertical blanking interval.

To achieve the above charge storage, the temporary storage array 30A is formed substantially identically in construction as the photo sensitive array 20A, but the former is, of course, optically shielded as a whole. Therefore, the temporary storage array 30A has parts corresponding the those of the photo sensitive array 20A identified with corresponding reference numerals but with a prime (') added.

The charges stored in the array 30A are sequentially read out with a read-out pulse or sampling pulse applied to the read-out register 40A, and hence an output video signal is derived from an output terminal 11A. The read-out array 40A includes only read-out cells $12_1$, - - -, $12_n$ common to all the picture elements in the horizontal direction. Since the reading-out of the stored charges is carried out with two-phase sampling pulses $\phi_A$ and $\phi_B$, two electrodes $13_{1-a}$ and $13_{1-b}$, - - -, $13_{n-a}$ and $13_{n-b}$ are formed in the respective read-out cells $12_1$ - - -, $12_n$.

FIG. 2 shows an embodiment of the solid state color camera according to the invention in which two of the CCDs 10A and 10B are used. In this embodiment, the same object image is projected onto the two CCDs 10A and 10B, respectively.

The case where the CCD 10A has a temporary storage array 30A is a mere example, and it may be possible to use a CCD without temporary storage array 30A. A solid state image sensor formed of a photo diode array or the like can be used as alternatives.

In the embodiment of FIG. 2, the object image of an object 14 is projected through a lens 15 and along optical paths (illustrated by broken lines) to a pair of CCDs 10A and 10B, respectively. A half mirror 16 and a mirror 17 are located in the optical paths. First and second color filters 18A and 18B which have color selective characteristics described below, are located in the optical paths in front of CCDs 10A and 10B, respectively.

In this case, the object image 14 is projected onto the CCDs 10A and 10B with a relative positional shift of $\tau H/2$, as shown in FIG. 3. That is, as shown in FIG. 3, when the CCD 10A is taken as a reference, the other CCD 10B is shifted therefrom such that the object image 14 projected onto the CCD 10B is shifted by just $\tau H/2$ from that projected onto the CCD 10A.

The object image 14 projected onto the CCDs 10A and 10B with the shift of $\tau H/2$ are derived from output terminals 11A and 11B as electric signals corresponding to the amount of light of the object image by the supply of the sampling pulses $\phi_A$ and $\phi_B$ at the frequency of $f_c$. These electric signals are fed through low pass filters 19a and 19b which may pass a signal of frequency up to about $1.5 f_c$, and then to an adder 21. Video signals $S_A$ and $S_B$ are sequentially and alternately read out with a phase difference of 180°. If the video signals $S_A$ and $S_B$ are read out without a phase difference and the object image is projected onto the CCDs 10A and 10B with the positional difference of $\tau H/2$ as shown in FIG. 3, the video signals $S_A$ and $S_B$ from the CCDs 10A and 10B become the same in phase signal. Which is unfavorable for signal treatment described below.

In order to read out the video signals $S_A$ and $S_B$ with the common sampling signals $\phi_A$ and $\phi_B$, when the first sampling pulse $\phi_A$ is supplied to the read-out registers 40A and 40B so as to transfer the charges stored in the temporary storage arrays 30A and 30B during the dirst horizontal scanning interval to the read-out registers 40A and 40B, the wiring is so selected that the first electrodes $13_{1-a}$, $13_{2-a}$, - - - of the CCD 10A and the second electrodes $13_{1-b}$, $13_{2-b}$, - - - of the other CCD 10B (refer to FIG. 4 in hatched portions) are supplied with the sampling pulse $\phi_A$, and the other electrodes $13_{1-b}$, $13_{2-b}$, - - - of the CCD 10A and those $13_{1-a}$, $13_{2-a}$, - - - of the other CCD 10B are supplied with the sampling pulse $\phi_B$, as shown in FIG. 4. If the sampling pulses $\phi_A$ and $\phi_B$ are fed to the read-out registers 40A and 40B as described above, the video signals $S_A$ and $S_B$ derived therefrom sequentially and alternately have the phase difference of 180° therebetween. As a result, there is a phase difference of 180° between the composed video signals $S_A$ and $S_B$.

In the embodiment of the invention shown in FIG. 2, the first and second color filters 18A and 18B which have different color selectivity are respectively located in front of the CCDs 10A and 10B onto which the object image is projected respectively, as mentioned above. As shown in FIG. 5, each of the color filters 18A and 18B consists of first and second horizontally extended color stripe filter elements 22a and 22b each of which has the same width as the alignment pitch of the picture elements of the CCD in the vertical direction and is elongated in the horizontal scanning direction. A desired number of the first and second color stripe filter elements 22a and 22b are aligned in the vertical direction alternately. The first and second color strip filter elements 22a and 22b pass therethrough a green (G) color light commonly, but have optical low pass characteristics such that they are, for example, narrow band for red and blue (R and B) color lights. In order to provide an optical narrow band for R-and B-lights, it is sufficient that as shown in FIG. 2 by a dotted line, as interference filters F based upon the interference theory or optical low pass filter made of such a material which has double refraction characteristics is disposed between, for example, the lens 15 and the object 14. Thus, the color filters 18A and 18B are such filters that the white color or R-, G- and B- color components are obtained by composing the information from the first color filter elements 22a and similarly the R-, G- and B-color components are obtained by composing the information from the second color filter element 22b.

Practically, if the first color filter element 22a of the first color filter 18A is selected to pass a yellow light (yl) and its second color filter element 22b is selected to pass therethrough a white light (W), as shown in FIG. 5 the first color filter element 22a of the second color filter 18B is selected to pass a cyan light (Cy) and its second color filter element 22b is selected to pass therethrough a green light (G) as shown in FIG. 5. Thus, if the first and second color filters 18A and 18B, which have different color selectivities, are disposed in front of the CCDs 10A and 10B, respectively, the object image of the object 14 is projected onto the CCDs 10A and 10B as different color decomposite images, respectively. As a result, the video signals $S_A$ and $S_B$ have color components with the green light as a common component.

Therefore, if video signals $S_{AO}$ and $S_{BO}$ obtained from the first color filter elements 22a of the CCDs 10A and 10B during the odd number horizontal scanning periods are added in the adder 21, the frequency spectrum is mixed signal $S_O$(odd number) can be shown in FIG. 6A. That is, the color component from the first color filter 18A is the R- and G- components obtained at the first color filter element 22a. In this case, the R-light is selected to be narrow in band by the optical system previously described, so that as shown in FIG. 7A the band of the R-light (refer to the solid 31b) is narrower than that of the G-light (refer to the solid line 31a). In the illustrated example the band of R-light is so restricted it is in a lower band of the DC components $S_{DCAO}$. In this example, the band is about 500 - 1000 KHz. Accordingly, in side band components $S_{SBAO}$, the side band of the G-light is extended to the DC components $S_{DCAO}$ as shown by a dotted line 32a, and the portion with hatched lines in FIG. 7A appears as the sampling error. However, since the R-light is narrow in band, it is shown in FIG. 7A by a solid line 32b.

Since the color components corresponding to the G- and B-lights are obtained from the first color filter elements 22a of the second color filter 18B, their spectrum is shown in FIG. 7B. Thus, similar to the case of the spectrum shown in FIG. 7A, a sampling error is found. In the latter case, it is of course that the B-light is selected to be narrow in band.

Here, if the first color filter 18A is taken as a reference, the phase relationship among the side band components become 0° as shown in FIG. 7A. However, since a signal is derived in such a manner that the second color filter 18B is shifted by 180° from the first color filter 18A, FIGS. 7A and 7B are reversed in phase. Thus, if the output signals $S_{AO}$ and $S_{BO}$ shown in FIGS. 7A and 7B are composed, the level of the G-light in the DC components $S_{DC}$ is twice that of the B- and R-light, and the side band components corresponding to the G-lights in the side band components $S_{SB}$ are cancelled due to the fact that they are reversed in phase. As a result, if the odd number video signals $S_{AO}$ and $S_{BO}$ are composed, the sampling errors caused by the side band component of the G-lights are eliminated. In this case, the B-light is obtained with a phase difference of 180° relative to the R-light.

The video signals $S_{AE}$ and $S_{BE}$ obtained from the odd number elements (the second color picture elements 22b) are added in the adder 21 similar to the above, and the spectrum of the resultant signal is shown in FIG. 6B, which accompanies with no sampling error.

The mixed signals $S_O$ and $S_E$ are supplied through a low pass filter 26 to a matrix circuit 27 (refer to FIG. 2). If the pass band of the low pass filter 26 is selected to be that of the DC components $S_{DC}$, the respective side band components $S_{SBO}$ and $S_{SBE}$ are eliminated, and hence the DC components without sampling errors are only applied to the matrix circuit 27.

The DC components $S_{DC}$ correspond to the luminance signal of the composite color video signal, so that they are referred to hereinafter as a luminance signal $S_Y$.

The luminance signal $S_Y$ and mixed signals $S_O$ and $S_E$ are fed to a first subtractor 28 by which the color components are extracted. That is, if the luminance signal $S_Y$ is subtracted from the mixed $S_O$ at odd number elements, the side band components $S_{SBO}$ having the phase relation shown in FIG. 6D are obtained. Similarly, the side band components $S_{SBE}$ having the relation shown in FIG. 6E are obtained at even number elements.

In the example of FIG. 2, reference numberal 29 indicates a delay circuit which is inserted between the adder 21 and the subtracter 28 so as to compensate for the delay of the signals caused by the low pass filter 26.

Since the side band components $S_{SBO}$ and $S_{SBE}$ are obtained sequentially and alternately at every horizontal scanning period, they are supplied to a detector through the following operational circuit. That is, the side band components $S_{SBO}$ and $S_{SBE}$ are fed to a delay circuit 33 having a delay time selected to correspond to one horizontal scanning period, and the delayed outputs from the delay circuit 33 are fed to a second adder 34 and a second subtractor 35, respectively, which are supplied with side band components $S_{SBO}$ and $S_{SBE}$, which are not delayed. If the signal calculation is carried out at every horizontal scanning period, the R-light component is derived from the second adder 34. Thus, if the R-light component is fed to a first detector 36 whose detecting axis is selected to be the same phase as the R-light, the R-light component is detected and then fed through a low pass filter 38 to the matrix circuit 27, while the color component corresponding to the B-light is derived from the second subtractor 35, so that if it is fed to a second detector 37 having a detecting axis identical in phase with the B-light, it is detected and fed to the matrix circuit 27 through a low pass filter 39. Thus, the luminance signal $S_Y$ and color difference signals (R-Y) and (B-Y) in, for example, the NTSC system can be delivered to output terminals 27a, 27b and 27c extending from the matrix circuit 27. In FIG. 2, reference numeral 43 indicates a delay circuit inserted between the low pass filter 26 and the matrix circuit 27 to compensate for the delay time caused the low pass filters 38 and 39.

Since the sampling error is eliminated from the composite color signal in the NTSC system, it is possible to expand the band of the luminance signal to about the sampling frequency $f_c$. As a result, the resolution is improved. In this case, if the sampling frequency $f_c$ is selected at 4.5 MHz, the number $n$ of picture elements of the CCD in the horizontal direction can be in the order of 240. Further, if the transmission band of the luminance signal $S_Y$ is selected at 3.5 $MH_z$, and the sampling frequency $f_c$ is selected at 4.0 $MH_z$, a CCD which has 210 picture elements in the horizontal direction can be employed.

If the sampling error is eliminated, and the band is expanded to 4.5 $MH_z$ as in the prior art, the sampling frequency $f_c$ must be selected more than 8.0 $MH_z$. Therefore, the CCD must have more than 700 picture elements in the horizontal direction. However, if the number $n$ of picture elements in the CCDs increase as mentioned just above the manufacture of such a CCD becomes difficult to the point where it is impractical to provide a solid state color camera with such a CCD.

As previously described, since in the invention, the CCDs 10A and 10B are shifted relative to each other, and the object image is projected thereto, to resolution in the horizontal direction is improved without increasing the number of picture elements of the CCD in the horizontal direction. It may be, of course, possible that if the CCDs 10A and 10B are shifted in the vertical direction by $\tau_H'_{/2}$ (where $\tau_H'$ represents the alignment pitch of picture elements of the CCD in the vertical direction), the resolution in the vertical direction could be improved.

In the example of this invention shown in FIG. 2, color filters having the combination of color stripe filter elements shown in the following Table 1, (I) are employed as the first and the second color filters 18A and 18B, but there is no need to limit the example of FIG. 2 to the example (I) in the Table 1. If a combination of the examples (II) and (III) in the Table 1 are used as the color filters 18A and 18B, respectively, the same effects can be obtained. In short, an optical color filter which may be used in this invention is only required to have the G-light as a common passing light and narrow band characteristics for the R- and B-lights. In this case, it is possible that the lights passing through the first and second color stripe filter elements 22a and 22b can be exchanged.

are read out from the CCDs, the signals are read out sequentially and alternatively from the CCDs with a phase difference of 120° with respect to one another an then calculated to avoid the production of sampling error and to enhance the horizontal resolution without increasing the number of picture elements in the horizontal direction.

As shown in FIG. 8, in the second example of this invention, the image of an object 114 is projected through an optical lens 115 and along optical paths 1 onto three-phase type CCDs, 110A to 110C, satisfying the above relative positional conditions. In FIG. 8, reference numerals 116A and 116b indicate half mirrors 117a and 117b mirrors and 118A to 118C, three color filters which have desired color selectivities to be described below.

In this example, the relative positional relationship between the object image 114 and the CCDs is so selected that the object image 114 projected onto the CCDs 110A to 110C is shifted by $\tau H/3$ with respect to one another. To this end, as shown in FIG. 9, when the CCD 110A is taken as a reference, the object image 114 projected onto the CCD 110B is shifted by just $\tau H/3$ from that projected onto the CCD 110A, and that projected onto the CCD 110C is further shifted by $\tau H/3$ from that projected onto the CCD 110B. That is, the CCDs 110A to 110C are shifted by $\tau H/3$ with respect to one another, and the object image 114 is projected thereonto, respectively.

The object image 114 projected onto the CCDs 110A to 110C are derived as electric signals as output terminals 111A to 111C of the CCDs 110A to 110C by applying sampling pulses $\phi_A$ to $\phi_C$ with the frequency $f_c$. These electric signals are supplied through low pass filters 119a to 119c, each of which passes a signal of the frequency up to 1.5 $f_c$, to an adder 121 to be combined. In this case, upon reading out video signals $S_A$ to $S_C$ from the CCDs 110A to 110C, the video signals $S_A$ to $S_C$ are sequentially read out with a phase difference of $2\pi/N$ (where N represents the number of CCDs, so that in this example, the phase difference is 120°). That is, Table I

| Kind of Filter | Color Filter Element | Above Example (I) | Another Example (II) | Further Example (III) |
|---|---|---|---|---|
| First Color Filter Element(18A) | First (22a) | Yl | $C_y$ | Yl |
| | Second (22b) | W | W | Cy |
| Second Color Filter Element (18B) | First (22a) | $C_y$ | Yl | W |
| | Second (22b) | G | G | G |

In the foregoing, a two-phase type CCD is described as the CCD, but a well known three-phase type CCD can also be employed in this invention.

Another embodiment of the solid state color camera according to this invention will be described with reference to FIGS. 8 to 14, in which three-phase type CCDs are employed.

In the second example of this invention an object image is projected onto respective three-phase type CCDs which are shifted relative to one another by $\tau H/3$, where $\tau_H$ represents the horizontal alignment pitch of picture elements in each CCD. In this case, color filters having different color selectivities are located in the optical paths from the object ot the CCDs to project different color decomposed images of the same object onto the CCDs, respectively. When signals as shown in FIG. 10, the sampling pulses $\phi_A$ to $\phi_C$ are supplied to read-out registers 140A to 140C of the CCDs 110A to 110C, respectively. In this case, read-out cells $112_1$ to $112_n$ formed in each of the read-out registers 140A to 140C correspond to the picture elements of each of the CCDs 110A to 110C in the horizontal direction, and each of the read-out cells $112_1$ to $112_n$ is divided into three electrodes $113_{1-a}$, $113_{1-b}$, $113_{1-c}$, - - - $113_{n-a}$, $113_{n-b}$, $113_{n-c}$.

Thus, in order to produce a phase difference of 120° between the read-out registers 140A to 140C by the sampling pulses $\phi_A$ to $\phi_C$ themselves which are supplied to the corresponding electrodes $113_{1-a}$, $113_{2-a}$, - - - of the read-out registers 140A to 140C, the same sampling pulses $\phi_A$ to $\phi_C$ are shifted one by one as shown in FIG. 10. Thus, signals stored in three temporary storage arrays 130A to 130C are derived from the read-out registers 140A to 140C as the video signals $S_A$ to $S_C$ with the phase difference of 120° with respect to one another.

Each of the color filters 118A to 118C are formed of first and second color stripe filter elements 22a and 22b aligned sequentially and alternately with a predetermined alignment pitch as shown in FIG. 11. In this case, the first color stripe filter 22a passes at least one specific primary color light, while the second color stripe filter element 22b passes at least one color light complementary to the above primary color light, as shown in FIG. 11.

By way of example, in the first color filter 118A which is disposed in front of the CCD 110A, if the first color stripe filter element 22a are selected to pass the red (R) color light, the second color stripe filter element 22b is selected to pass the cyan (Cy) color light complementary to the R-color. The color stripe filter elements 22a and 22b, corresponding to the R-and Cy-color lights, are aligned sequentially and alternately in the vertical direction of the CCD 110A to form the first color filter 118A, as shown in FIG. 11. Similarly, the second color filter 118B, disposed in front of the CCD 11B, is formed on the first color stripe filter element 22a which passes the green (G) color light and the second color stripe filter element 22b which passes a magenta (M) color light, and the third color filter 118C is formed on the first color stripe filter elements 22a which passes the blue (B) color light and the second color stripe filter elements 22b which passes the yellow (yl) color light as shown in FIG. 11, respectively.

Figure 12A:
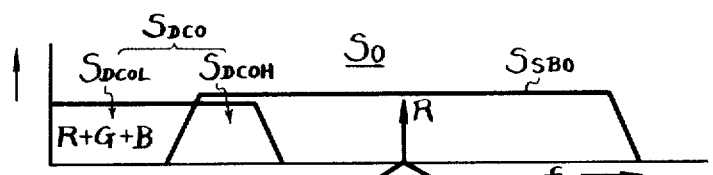
FIGS. 12A to 12E, inclusive, are frequency spectrum diagrams used for explaining the operation of the solid state color camera of FIG. 8.

Accordingly, if the video signals $S_A$ to $S_C$, obtained from the CCDs 110A to 110C at odd numbered elements, are applied to the adder 121 to be combined or composed, the frequency spectrum of a mixed signal $S_o$ is shown in FIG. 12A which includes the DC components $S_{DCO}$ and side band components $S_{SBO}$. In this case, a phase difference of 120° exists among the respective side band components $S_{SBO}$ obtained from the CCDs 110A to 110C. Thus, the phase relation is shown by the vector diagram in FIG. 12A when the CCD 110A is taken as a reference.

Figure 12B:
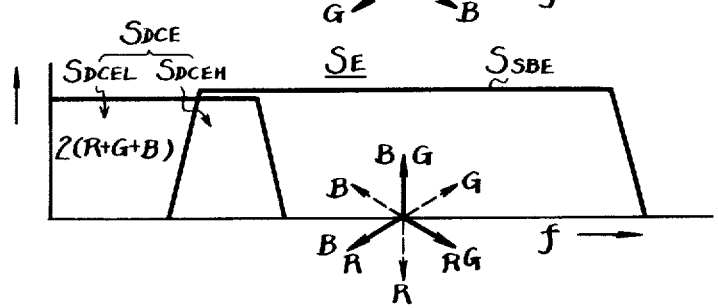

Similarly, at the even numbered elements, a mixed signal $S_E$ is obtained as shown in FIG. 12B. In this case, however, the levels of the DC components $S_{DCE}$ and side band components $S_{SBE}$ are twice as those that of the odd number, and the phase relation between the side band components $S_{SBE}$ is shown by the solid line vector diagram in FIG. 12B. If the phase relation is rewritten, it becomes as shown by the dotted-line voctor diagram.

Figure 12C:
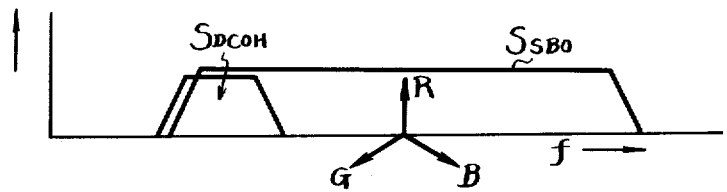
Figure 12D:
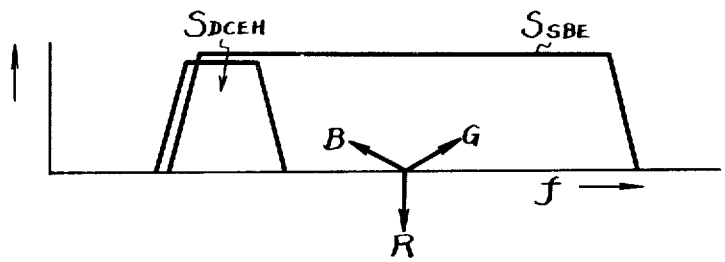
Figure 12E:
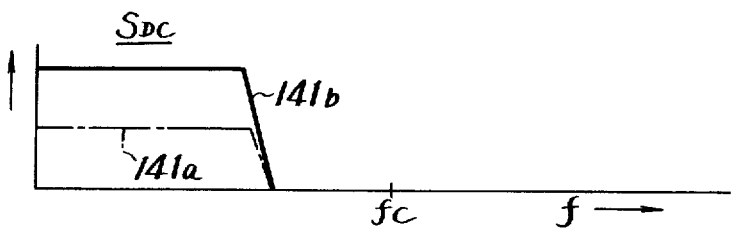

The thus obtained mixed signals $S_O$ and $S_E$ are supplied through a delay circuit 125 to be second adder 126 and also to a band pass filter 127 which extracts the side band components $S_{SBO}$ and $S_{SBE}$ as the color components shown in FIGS. 12C and 12D. In this case, the delay circuit 125 is so selected that its delay time becomes equal to that of the band pass filter 127. The side band components $S_{SBO}$ and $S_{SBE}$ extracted from the band pass filter 127 include within their low band regions the high band components $S_{DCOH}$ and $S_{DCEH}$ of the DC components $S_{DCO}$ and $S_{DCE}$. The side band components $S_{SBO}$ and $S_{SBE}$ restricted in band are applied through a delay circuit 128, whose delay time is the same as one horizontal scanning period of time, to be second adder 126 to be added to the mixed signals $S_O$ and $S_E$ which are not restricted in band. Accordingly, at the second adder 126, the video signals from the adjacent horizontal scanning periods, that is, during a certain order of odd number horizontal scanning period, the signal shown in FIG. 12C and the signal $S_E$ shown in FIG. 12B are added to each other. In this case, since the phases of the signals from the adjacent horizontal scanning periods are reversed, their side band components are cancelled. Thus, the second adder 126 produces only the DC component $S_{DC}$ (refer to the solid line 141b in FIG. 12E). During a certain order of even numbered horizontal scanning periods, the signal shown in FIG. 12D and the signal $S_O$ shown in FIG. 12A are added at the adder 126 which then produces only the DC component DC (refer to the broken line 141a in FIG. 12E). Thus, the sampling error which will otherwise develop in the output signal from the second adder 126 can be eliminated by adding the signals from the adjacent horizontal scanning period.

However, the levels of the DC components $S_{DC}$ obtained from the odd and even numbers are different from each other. If the level of the side band component $S_{DCO}$ shown in FIG. 12A is taken as ⅓, the level of the side band component $S_{DCE}$ shown in FIG. 12B is ⅔ due to the relationship between the color filters 118A to 118C. Therefore, at the odd number, the level of the low band of the side band component becomes ⅓, while that at the even number it becomes ⅔ by the addition in the second adder 126. For this reason, in example of FIG. 8, a level changer 129 is provided at the next stage of the second adder 126 which changes the level of the output signals from the adder 126 at every one horizontal period to equalize the levels of the respective signals during each horizontal period and then supply the same to a matrix circuit 131. That is, the output signal from the level changer 129 is used as the luminance signal Y of the composite color video signal.

Color components are obtained by using the verical correlation of the side band components $S_{SBO}$ and $S_{SBE}$ which are restricted in band. That is, the side band components $S_{SBO}$ and $S_{SBE}$ from the band pass filter 127 which are not delayed and the delayed side band components obtaining by passing the former through the delay circuit 128 are fed to a subtractor 133 through level changers 132b and 132a to achieve the calculations of signals having the correlation. As a result, the subtractor 133 produces the side band components $S_{SB}$ having the phase relation shown in FIG. 13A during the odd number horizontal period, and similarly the side band components $S_{SB}$ having the phase relation shown in FIG. 13B during the even number horizontal period.

There side band components are fed to detectors 134a and 134b having detecting axes which are changed at every one horizontal period to produce desired detected output signals $S_D$ and $S_D'$ as shown in FIG. 8. When the side band components from the odd number are detected, if the detecting axis of, for example, detector 134a is selected to be the same phase as that of the R-axis, the detector 134a produces the color component of R—(G + B)/2. Similarly, if the detecting axis of the other detector 134b is selected phase to be $\pi/2$ ahead of the R-axis the detector 134b produces the color component (B—G).

Figure 13A:
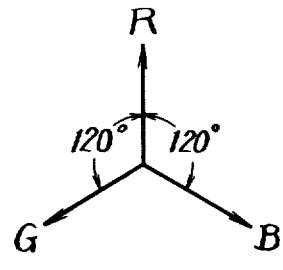
FIGS. 13A and 13B are vector diagrams used for explaining the operation of the solid state color camera shown in FIG. 8.
Figure 13B:
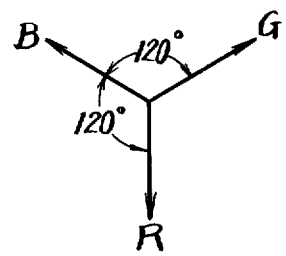

The side band components $S_{SB}$ at the even number shown in FIG. 13B are reversed in phase from those at the odd number shown in FIG. 13A, so that if the detecting axes of the detectors are selected reversed from those described above, the detector 134a may produce the color component of R—(G + B)/2 while the other detector may produce the color component of (B—G). These detected output signals $S_D$ and $S_D'$ are fed to the matrix circuit 131 which then produces desired video signals and delivers the same to output terminals 131a, 131b and 131c, respectively, extending from the matrix circuit 131.

In of FIG. 8, a low band component, which may affect the resolution of the luminance signal Y is used. The luminance signal Y is somewhat different from the luminance signal $Y_{NTSC}$ in the NTSC system. However, if the penetrating power of the respective color filters 118A to 118C is determined as shown in the following Table 2, a desired luminance signal $Y_{NTSC}$ of the NTSC system which used the entire band from low to high may be obtained.

Table 2

| Kind of Filter | Color Filter Element | Penetrating Factor |
|---|---|---|
| First color filter (18A) | First (122a):R | 0.7R+0.3G |
| | Second (122b):Cy | 0.1R+0.735G+0.165B |
| Second color filter (118B) | First (122a):G | 0.1R+0.9G |
| | Second (122b):M | 0.4R+0.435G+0.165B |
| Third color filter (118C) | First (122a):B | 0.1R+0.57G+0.33B |
| | Second (122b):Yl | 0.4R+0.6G |

If the signals corresponding to the first color stripe filter elements 122a determined by the above Table 2 (similar to the signals corresponding to the second color filter components 122b determined by the above Table 2) are composed, $S_Y \times 3 (0.3R + 0.59G + 0.11B)$. Thus, the desired luminance signal $Y_{NTSC}$ can be obtained.

Figure 14:
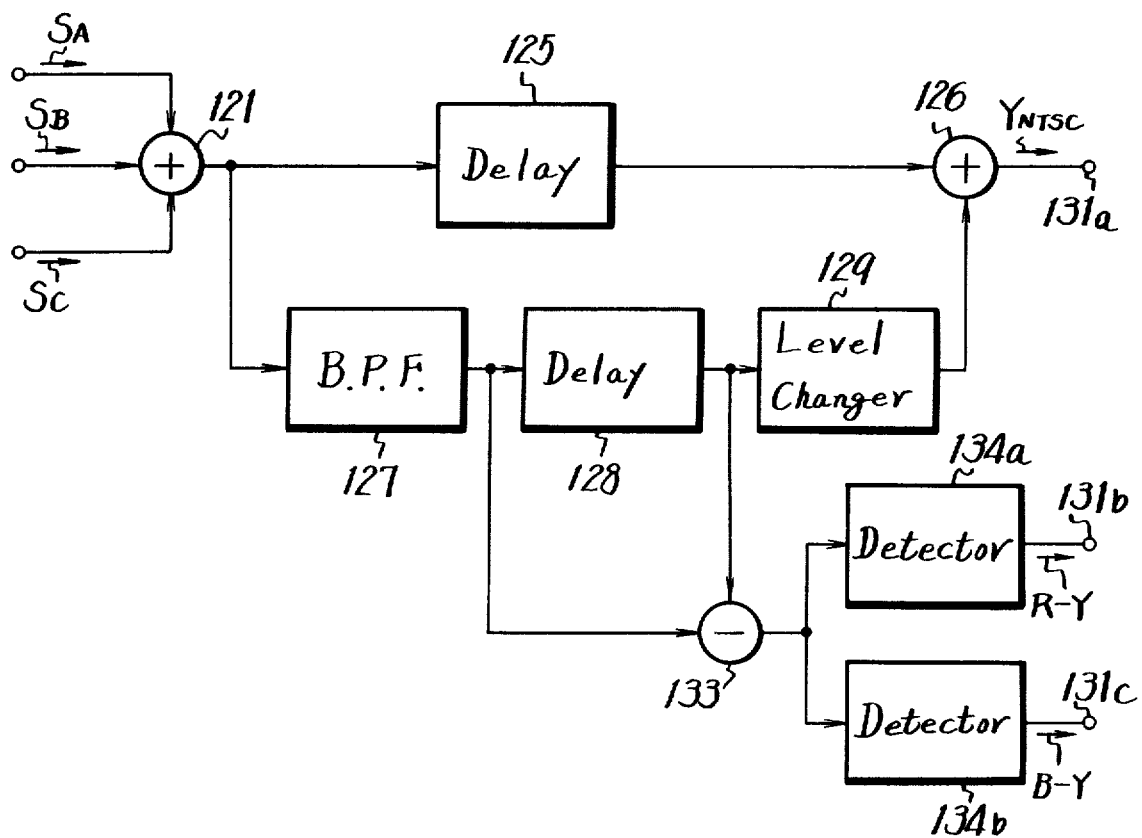
FIG. 14 is a block diagram showing a modification of the solid state color camera of FIG. 8.

FIG. 14 shows a further embodiment of the solid state color camera of this invention which uses the color filters 18A to 118C determined by the above Table 2, in which the parts corresponding to the embodiments shown in FIG. 8 are omitted and in which the same reference numerals as those used in FIG. 8 designate the same elements.

With the example of FIG. 14, the color difference signals of (R—Y) and (B—Y) are obtained as detected output signals. For this reason, the detecting axes of the detectors 134i a and 134b of this example are different from those of the detectors 134a and 134b used in FIG. 8. Further, level changer 129 for the luminance signal is provided in the path of the side band components.

It may be apparent that many modifications and variations of this invention can be effected by one skilled in the art without departing from the spirit or scope of the novel concepts set forth herein.

I claim as my invention:

1. A solid state color camera comprising:
   a plurality of image sensors, each having a plurality of picture-sensing units spaced apart by an alignment pitch of $\tau_H$,
   a number of color filters, each having color stripe elements extending in a horizontal direction and being aligned vertically to correspond to respective horizontal rows of said image sensors,
   means for displaying an image simultaneously on each of said image sensors through respective ones of said color filters,
   means for positions the image on each sensor with a displacment of $\tau_{H/N}$ in a given direction with respect to at least one other of said sensors where N equals the number of image sensors in said camera,
   means coupled to said picture sensing units for sequentially reading said image being displayed on said sensors in said given direction at a given read-out frequency and said reading means producing respective output signals,
   means associated with said reading means for shifting the read-out phases thereof by 2 $\pi_{/N}$,
   means coupled to said reading means for mixing their respective output signals therefrom, and
   means for deriving luminance and chrominance signals from said mixing means.

2. A solid state color camera in accordance with claim 1 further comprising detector means for deriving color signals from said chrominance signal.

3. A solid state color camera in accordance with claim 2 wherein Nequals 2.

4. A solid state color camera in accordance with claim 3 further comprising an optical lowpass filter in the incident light path of the object for limiting the bandwidth of particular color components.

5. A solid state color camera in accordance with claim 3 wherein N equals 3.

6. A solid state color camera in accordance with claim 2 wherein said chrominance signal deriving means includes time delay means for producing a delay equal to one horizontal scanning period and means for combining the delayed and an undelayed signal to produce the desired chrominance output signals.

* * * * *